United States Patent
Posselius et al.

(10) Patent No.: US 11,192,128 B2
(45) Date of Patent: Dec. 7, 2021

(54) INDEPENDENT NOZZLE INJECTION CONTROL SYSTEM FOR SPRAYERS

(71) Applicant: CNH Industrial America LLC, New Holland, PA (US)

(72) Inventors: John Posselius, Ephrata, PA (US); Tim Stombaugh, Nicholasville, KY (US)

(73) Assignee: CNH Industrial America LLC, New Holland, PA (US)

( * ) Notice: Subject to any disclaimer, the term of this patent is extended or adjusted under 35 U.S.C. 154(b) by 69 days.

(21) Appl. No.: 15/267,436

(22) Filed: Sep. 16, 2016

(65) Prior Publication Data

US 2017/0079200 A1    Mar. 23, 2017

Related U.S. Application Data

(60) Provisional application No. 62/219,917, filed on Sep. 17, 2015.

(51) Int. Cl.
| | |
|---|---|
| B05B 9/04 | (2006.01) |
| A01M 7/00 | (2006.01) |
| B05B 7/32 | (2006.01) |
| B05B 12/14 | (2006.01) |
| B05B 1/30 | (2006.01) |

(52) U.S. Cl.
CPC ............ *B05B 9/0403* (2013.01); *A01M 7/00* (2013.01); *B05B 7/32* (2013.01); *B05B 12/1418* (2013.01); *B05B 1/3053* (2013.01)

(58) Field of Classification Search
CPC ......... B05B 9/0403; B05B 1/30; B05B 12/02; A01M 7/00; F16K 31/06
USPC ....................................................... 239/159
See application file for complete search history.

(56) References Cited

U.S. PATENT DOCUMENTS

| | | | | |
|---|---|---|---|---|
| 4,196,852 A | * | 4/1980 | Thomas, III | A01M 7/0089 239/113 |
| 4,318,443 A | * | 3/1982 | Cummins | B01F 5/0408 169/15 |
| 4,358,054 A | | 11/1982 | Ehrat | |
| 4,714,196 A | | 12/1987 | McEachern et al. | |

(Continued)

FOREIGN PATENT DOCUMENTS

WO    2005123503 A1    12/2005

OTHER PUBLICATIONS

"Development of a Single Nozzle, High Pressure Liquid Pesticide Metering and Injection System," Brian David Luck, University of Kentucky, 2009.

(Continued)

*Primary Examiner* — Chee-Chong Lee
(74) *Attorney, Agent, or Firm* — Rebecca L. Henkel; Rickard K. DeMille

(57) ABSTRACT

By injecting a chemical fluid and a carrier fluid directly at each nozzle, and by then mixing the fluids at each nozzle to produce a mixed fluid, an improved spray system may be provided which does not contaminate the tank or distribution system with chemical fluid and which allows improved spraying with minimal delay. Accordingly, a system is provided on a field sprayer for independently controlling the flow rate of concentrated chemical fluid to individual spray nozzles using a high pressure chemical distribution rail or loop routed to each nozzle and solenoid injection valves to control the flow of chemical fluid to each nozzle independently.

16 Claims, 6 Drawing Sheets

(56) References Cited

U.S. PATENT DOCUMENTS

| | | | |
|---|---|---|---|
| 4,723,709 A * | 2/1988 | Curran, Jr. | A01M 7/0042 239/110 |
| 4,938,242 A * | 7/1990 | Redmond | A01M 7/0085 134/169 R |
| 5,016,817 A * | 5/1991 | Ghate | A01M 7/0092 239/113 |
| 5,125,576 A * | 6/1992 | Ziegenbein | A01M 7/0085 239/113 |
| 5,134,961 A | 8/1992 | Giles et al. | |
| 5,433,380 A * | 7/1995 | Hahn | A01M 7/0085 134/169 R |
| 5,653,389 A | 8/1997 | Henderson et al. | |
| 5,678,771 A | 10/1997 | Chapman | |
| 6,230,091 B1 | 5/2001 | McQuinn | |
| 6,820,828 B1 | 11/2004 | Greenwalt | |
| 8,109,448 B2 | 2/2012 | Giles | |
| 8,800,887 B2 | 8/2014 | Moeller et al. | |
| 2002/0030117 A1 | 3/2002 | Bryan et al. | |
| 2002/0190140 A1 * | 12/2002 | Arenson | A62C 31/03 239/391 |
| 2003/0097314 A1 | 5/2003 | Crisp, III et al. | |
| 2006/0000851 A1 | 1/2006 | Girard et al. | |
| 2008/0230624 A1 | 9/2008 | Giles et al. | |
| 2012/0187210 A1 | 7/2012 | Wheeler et al. | |
| 2012/0248227 A1 | 10/2012 | Peterson | |

OTHER PUBLICATIONS

"Development of a Variable-Orifice Spray Nozzle with High Pressure Chemical Injection for Improved Pesticide Efficacy," Joe David Luck, University of Kentucky, 2012.

John Deere Self-Propelled Sprayers; Retrieved on Nov. 3, 2014 from web-site: http://www.deere.com/en_US/products/equipment/self_propelled_sprayers/self_propelled_sprayers.page.

* cited by examiner

INDEPENDENT NOZZLE INJECTION CONTROL SYSTEM FOR SPRAYERS

CROSS-REFERENCE TO RELATED APPLICATIONS

This is a non-provisional application based upon U.S. provisional patent application Ser. No. 62/219,917, entitled "Independent Nozzle Injection Control System for Sprayers," filed Sep. 17, 2015, which is incorporated herein by reference.

FIELD OF THE INVENTION

The present invention relates generally to agricultural implements, and in particular, a spray system providing independent nozzle injection control for use with agricultural field sprayers.

BACKGROUND OF THE INVENTION

Field sprayers, as known in the art, are typically attached to, or towed by, an agricultural implement such as a tractor or other vehicle, or are a dedicated self-propelled sprayer vehicle. Such sprayers generally include a fluid holding tank supported by a frame. The fluid holding tank typically stores a crop protection fluid, such as pesticides or liquid fertilizer, which often consists of a carrier fluid (such as water) mixed with a chemical at a predetermined concentration. The fluid holding tank, in turn, is fluidly coupled to a series of spray nozzles spaced apart from one another along booms extending outwardly from the frame. Accordingly, the crop protection fluid may be dispensed through the spray nozzles onto the farm field, preferably in an even distribution spray pattern, so that the fluid is applied consistently across the farm field.

Current sprayers typically rely on mixing a certain amount of concentrated chemicals into the water in a bulk tank on the machine. Then, the mixed fluid is dispensed to nozzles of the machine with a single point pressure and flow control via distribution valves and manifolds. However, such systems do not allow for alteration of the chemical combination or concentration after the chemical fluid is mixed. Also, once the spraying operation is completed, the entire tank and distribution system ordinarily must be cleaned thoroughly, which requires a significant amount of water and creates disposal challenges.

Some alternatives provide injection systems in which the chemical fluid is injected into the carrier stream at a single point just prior to the distribution valves and manifolds. While these systems may eliminate contamination of the tank, there is still contamination of much of the distribution system. Moreover, these systems may cause significant and variable delays between injection and nozzle distribution points.

What is Deeded is an improved system for spraying a mixed fluid which includes a chemical fluid diluted in a carrier fluid without contaminating the tank and distribution system and/or with minimal delay.

SUMMARY OF THE INVENTION

The inventors have recognized that by injecting a chemical fluid and a carrier fluid directly at each nozzle, and by then mixing the fluids at each nozzle to produce a mixed fluid, an improved spray system may be provided which does not contaminate the tank or distribution system with chemical fluid and which allows improved spraying with minimal delay. Accordingly, a system is provided on a field sprayer for independently controlling the flow rate of concentrated chemical fluid to individual spray nozzles using a high pressure chemical distribution rail or loop routed to each nozzle and solenoid injection valves to control the flow of chemical fluid to each nozzle independently.

The independent metering and distribution system for the chemical may be installed on the sprayer. It may consist of separate smaller supply tanks for each concentrated chemical, extra smaller chemical distribution lines across the boom, solenoid valves at each nozzle, and pumps and valves to control chemical delivery.

The high pressure chemical distribution loop may extend along a sprayer boom. The loop may supply pressurized chemical fluid to metering solenoid valves located at each nozzle. Chemical fluid may be metered through these valves and injected directly into the nozzle body where it is mixed with lower pressure carrier fluid (such as water) that is metered separately. A variable displacement injection pump may move the concentrated chemical through the loop while one or more relief valves may maintain pressures in the high pressure side of the loop. A number of chemical charge pumps may inject concentrated chemical fluid into a lower pressure side of the high pressure distribution loop. The flow from the injection pump can be decreased to reduce energy usage when less chemical is required by the boom or increased to accelerate chemical mixing in the loop and insure uniform distribution to all nozzle valves when the mixture of chemicals is changed.

Accordingly, the system provides independent flow control of individual chemical and carrier fluids, Changes in chemical output rate may be almost instantaneous as the chemical fluid injection point is provided directly at each nozzle. As chemical fluid is introduced into the carrier fluid for mixing at each nozzle, there is no chemical contamination of a bulk tank or larger distribution lines or system. Therefore, cleanout may require significantly less water and may be simplified by running carrier fluid (without chemical fluid) though the nozzles.

Specifically then, one aspect of the present invention provides a spray system for use with an agricultural sprayer including: a first distribution rail for distributing a first fluid: a second distribution rail for distributing a second fluid; a plurality of valves in communication with the second distribution rail; and a plurality of spray nozzle assemblies, each spray nozzle assembly providing first and second inlets for receiving first and second fluids, respectively, a mixing chamber for mixing the first and second fluids to provide a mixed fluid, and an outlet for spraying the mixed fluid. The first inlet of each spray nozzle assembly may be in communication with the first distribution rail for receiving the first fluid, the second inlet of each spray nozzle assembly may be in communication with a valve for receiving the second fluid, and the second distribution rail may distribute the second fluid at a higher pressure than the first distribution rail distributes the first fluid.

The second distribution rail may include a circulating pump and a first pressure relief valve, and the pressure of the second fluid downstream of the circulating pump may be greater than the pressure of the second fluid downstream of the pressure relief valve. The second distribution rail may further include a second pressure relief valve, and the pressure of the second fluid downstream of the first pressure relief valve may be greater than the pressure of the second fluid downstream of the second pressure relief valve. The second distribution rail may further include an accumulator between the circulating pump and at least one of the first and second pressure relief valves. The plurality of valves may be in communication with the second distribution rail between the first and second pressure relief valves.

Other aspects, objects, features, and advantages of the invention will become apparent to those skilled in the art from the following detailed description, and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
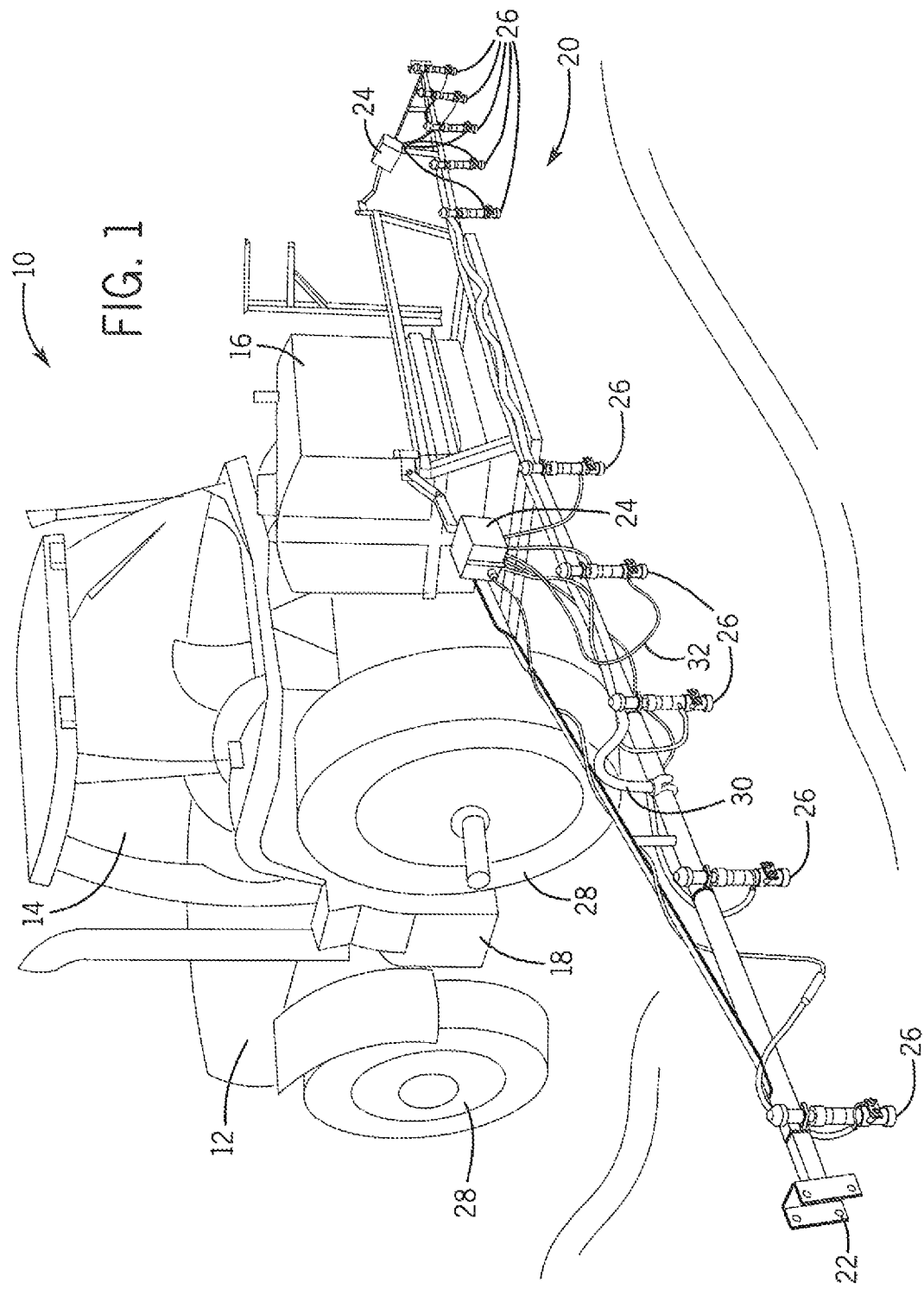
FIG. 1 illustrates a pictorial view of a spraying system in accordance with the present invention.

Referring generally to the drawings, and more particularly to FIG. 1, an exemplar agricultural product application system, which in the illustrated embodiment is a field spraying system 10 (a tractor with a three point mounted sprayer attached), is shown in accordance with the present invention. The field spraying system 10 may comprise a self-propelled sprayer 12 having an operator cab 14 and a primary fluid tank 16 supported by a chassis 18. A rear end 20 of the chassis 18 may support a wing boom 22 (or multiple wing booms) to which one or more secondary fluid tanks, which could be provided as illustrated by reference numeral 24, may be supported. The wing boom 22 also supports a series of spray nozzle assemblies 26 for spraying an area of a field. The chassis 18 is supported by a set of wheels 28, and the wing boom 22, depending on size, may be supported by a set of smaller wheels (not shown).

Primary distribution lines 30 are flow coupled between the primary fluid tank 16 and the spray nozzle assemblies 26. The primary fluid tank 16 may typically store a carrier fluid such as water. The primary distribution lines 30 may provide flow of the carrier fluid to the spray nozzle assemblies 26 directly or indirectly, such as via one or more charge pumps, accumulators, control valves, pressure relief valves, manifolds and/or supplemental distribution lines in the path as understood in the art for effecting various flow rates, pressures and control for sprayer configurations.

Secondary distribution lines, which could be provided as illustrated by reference numeral 32, may be flow coupled between one or more of the secondary fluid tanks 24 and the spray nozzle assemblies 26. The secondary fluid tanks 24 may typically store a chemical fluid, such as a liquid fertilizer, pesticide, herbicide, or the like. The secondary distribution lines 32 may provide flow of the chemical fluid to the spray nozzle assemblies 26 directly or indirectly, such as via one or more charge pumps, accumulators, control valves, pressure relief valves, headers, manifolds and/or supplemental distribution lines in the path as understood in the art for effecting various flow rates, pressures and control for sprayer configurations. Accordingly, the carrier fluid and the chemical fluid may be stored in different tanks and subsequently mixed at each of the spray nozzle assemblies 26 thereby providing improved distribution in the field. The secondary fluid tanks 24 are typically smaller than the primary fluid tank 16.

Figure 2:
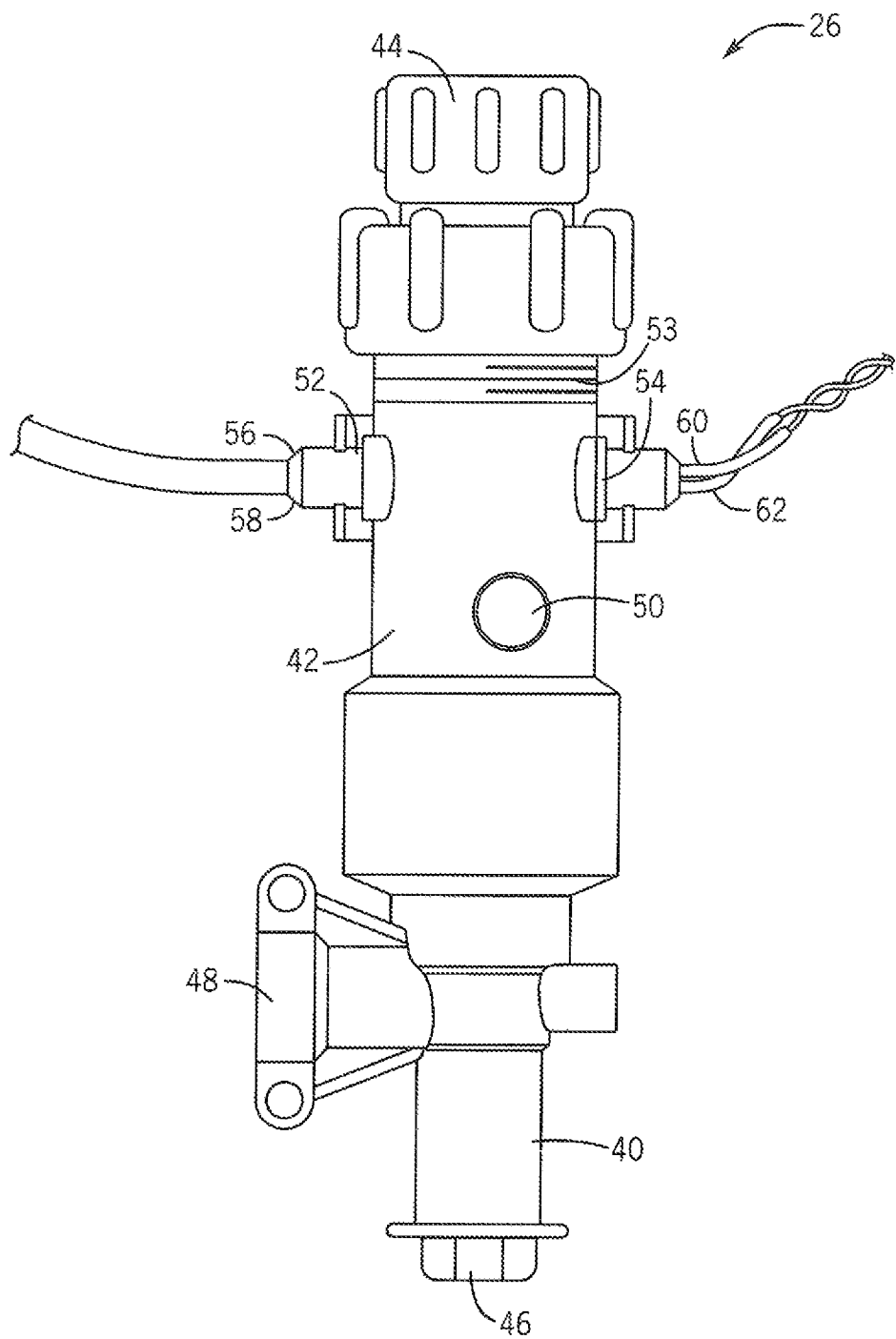
FIG. 2 illustrates a pictorial view of a spray nozzle assembly in accordance with the present invention.

Referring now to FIG. 2, in a spray system, a pictorial view of an exemplar spray nozzle assembly 26 is provided in accordance with the present invention. The spray nozzle assembly 26 may generally include a nozzle body 40, coupled in turn to a mixing body 42, coupled in turn to a control valve 44. In one aspect, the nozzle body 40 may be thread coupled to the mixing body 42, and the mixing body 42 may be thread coupled to the control valve 44, although other temporary or permanent coupling techniques known in the art could be used, such as pressure fittings and/or adhesive agents.

The nozzle body 40 includes a nozzle outlet 46 (exposing an orifice) for spraying a mixed fluid which will typically consist of a carrier fluid (such as water) mixed with a chemical fluid at some concentration. The nozzle body 40 may also include a nozzle body inlet 48 for receiving the carrier fluid. The carrier fluid may come from the primary fluid tank 16 via the primary distribution lines 30.

The mixing body 42 may include a mixing body inlet 50 for receiving the chemical fluid (such as a liquid fertilizer, pesticide, herbicide, or the like). The chemical fluid may come from either of the secondary fluid tanks 24 via the secondary distribution lines 32. Within the mixing body 42, a flow control mechanism (shown in FIG. 3) may provide a mixing chamber for mixing the carrier fluid with the chemical fluid in the nozzle to provide the mixed fluid.

Figure 3:
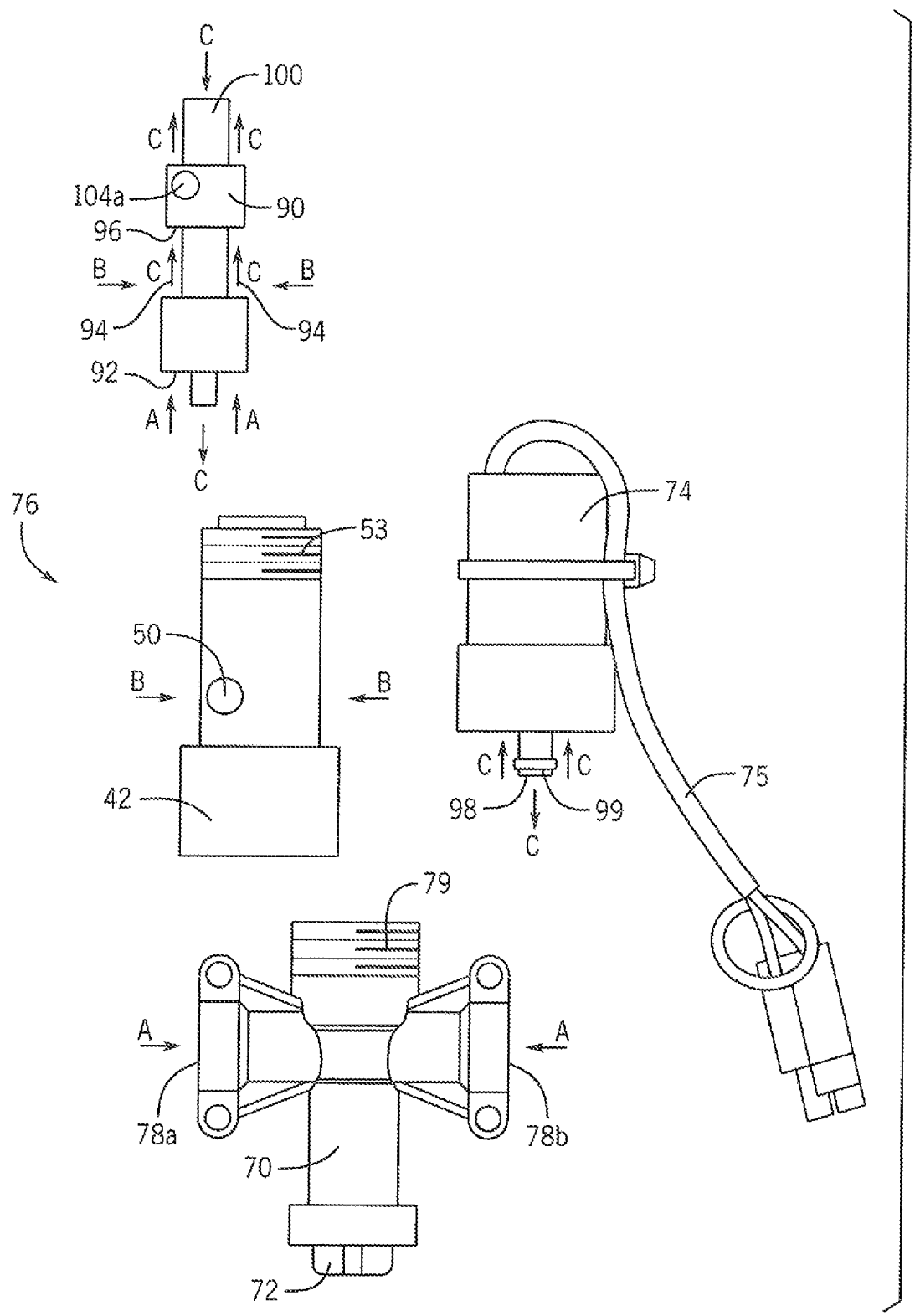
FIG. 3 illustrates an exploded pictorial view of an alternative spray nozzle assembly having the mixing body of FIG. 2, but with an alternative nozzle body and an alternative control valve, in accordance with the present invention.

The control valve 44 operates to stop the mixed fluid from flowing to the nozzle outlet 46, or to allow the mixed fluid to flow to the nozzle outlet 46 for spraying. The control valve 44 could be a passive check valve, as shown in FIG. 2, in which the mixed fluid is mechanically stopped from flowing if there is insufficient pressure applied by the mixed fluid against a valve mechanism, or the mixed fluid is allowed to flow if there is a build-up of sufficient pressure of the mixed fluid against the valve mechanism. Alternatively, the control valve 44 could be an actively controlled solenoid valve, as shown in FIG. 3 by reference numeral 74, in which the mixed fluid is stopped from flowing or allowed to flow depending on a control signal provided to a solenoid which actuates a valve. Accordingly, the control valve 44 may serve to prevent undesirable leaking of the mixed fluid. Also, the control valve 44 may be operator or computer controlled in the field.

Still referring to FIG. 2, a light source 52 and a light sensitive receiver 54 may each be connected to the spray nozzle assembly 26. The light source 52 and the light sensitive receiver 54 may be contained in separate housings, and each of the housings may fit in opposing openings of the mixing body 42 with fluid tight seals. The light source 52 may be any circuit, element or device for emitting light in the mixing body, and may preferably be a Light Emitting Diode (LED). First and second light source signals 56 and 58, respectively, may interface with other control systems or circuitry of the field spraying system 10 and may allow for turning on or off the light source 52, biasing, and/or controlling the intensity, brightness and/or wavelength of light produced by the light source 52.

The light sensitive receiver 54 may be any circuit, element or device for receiving light in the mixing body and generating an electrical signal indicating an amount of light received by the light sensitive receiver 54. The light sensitive receiver 54 may preferably be a photodiode. In particular, the light sensitive receiver 54 may receive light from the light source 52 (passing through the mixed fluid) within the mixing body 42. First and second light sensitive receiver signals 60 and 62, respectively, may interface with other control systems or circuitry of the field spraying system 10 and may allow for sending an electrical signal indicating the amount of light received by the light sensitive receiver 54, biasing, and/or controlling the wavelength of light to which the light sensitive receiver 54 may be sensitive.

In sending the electrical signal indicating the amount of light received, one of the first and second light sensitive receiver signals 60 and 62, respectively, could be used to provide an analog voltage having a magnitude in proportion to the amount of light received by the light sensitive receiver 54, while the other of the first and second light sensitive receiver signals 60 and 62, respectively, could provide a reference level. In an alternative aspect, digital circuitry could be employed in the light sensitive receiver 54 so that the first and/or second light sensitive receiver signals 60 and/or 62, respectively, provide a digital representation of the magnitude of light received.

Referring now to FIG. 3, an exploded pictorial view of an alternative spray nozzle assembly 76 having the mixing body 42 of FIG. 2, but with an alternative nozzle body 70 and an alternative control valve 74, is provided in accordance with the present invention. In this aspect, the nozzle body 70 may include first and second nozzle body inlets 78a and 78h, respectively, for receiving the carrier fluid instead of a single nozzle inlet. Accordingly, the multiple inlets (the first and second nozzle body inlets 78a and 78b, respectively) may allow for alternative implementations of the spray nozzle assembly 76 in the field spraying system 10, such as ganging a plurality of spray nozzle assemblies 76 together. The nozzle body 70 may be coupled to the mixing body 42, for example, via nozzle body threading 79.

Also in this aspect, the control valve 74 is an actively controlled solenoid valve. Accordingly, mixed fluid is stopped from flowing or allowed to flow depending on a control signal provided, via wiring/interconnect 75, to a solenoid which controls the valve. The wiring/interconnect 75 may interface with other control systems or circuitry of the field spraying system 10 for control of spraying applications in the field. The control valve 74 may be coupled to the mixing body 42, for example, via mixing body threading 53. It will be appreciated that with this configuration, if desired, the mixing body 42 could be removed, and the control valve 74 coupled directly to the nozzle body 70, via nozzle body threading 79, to revert to a de-featured implementation.

Also in this aspect, the mixing body 42 of FIG. 2 is used. The mixing body 42 may include a mixing body inlet 50 (or alternatively first and second mixing body inlets) for receiving the chemical fluid.

Within the mixing body 42, a flow control mechanism 90 may be provided for directing fluid flow within the spray nozzle assembly 76. With additional reference to 4A, fluid flow is depicted by way of arrows reference characters. In particular, arrows with the reference character "A" denote flow of the carrier fluid; arrows with the reference character "B" denote flow of the chemical fluid; and arrows with the reference character "C" denote flow of the mixed fluid.

In operation, the carrier fluid A is received via the first and second nozzle body inlets 78a and 78b, respectively, of the nozzle body 70. The carrier fluid A is directed through a first interior opening 92 (which may be a plurality of openings) in the flow control mechanism 90, leading to a mixing chamber 94. The mixing chamber 94 may be defined by a cavity formed by exterior walls of the flow control mechanism 90 and interior walls of the mixing body 42.

The chemical fluid B is received via the mixing body inlet 50 of the mixing body 42. The chemical fluid B is directed to the mixing chamber 94, thereby mixing in the nozzle to form the mixed fluid C. The mixed fluid C, in turn, is directed through a second interior opening 96 (which may be a plurality of openings) in the flow control mechanism 90, leading to the control valve 74.

Upon sufficient pressure of the mixed fluid C, such as with a check valve, or upon actuation of the control valve 74, such as with the solenoid valve, the mixed fluid C will then flow through the control valve 74 and exit via a control valve outlet 98. The control valve outlet 98 is fluidly coupled with an interior channel 100 of the flow control mechanism 90 and may be fluid sealed with a sealing member 99. The mixed fluid C may then, in turn, travel through the interior channel 100 to an orifice 102 proximal to the nozzle outlet 72 of the nozzle body 70 for spraying.

Figure 4B:
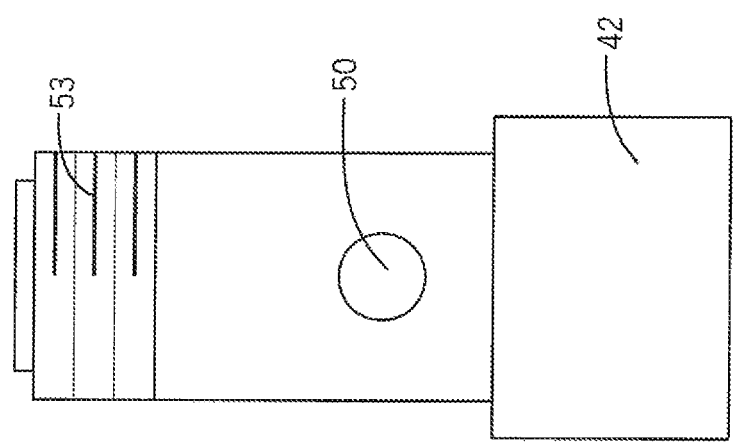
FIG. 4B illustrates a pictorial view of a flow control body, each in accordance with the present invention.
Figure 4A:
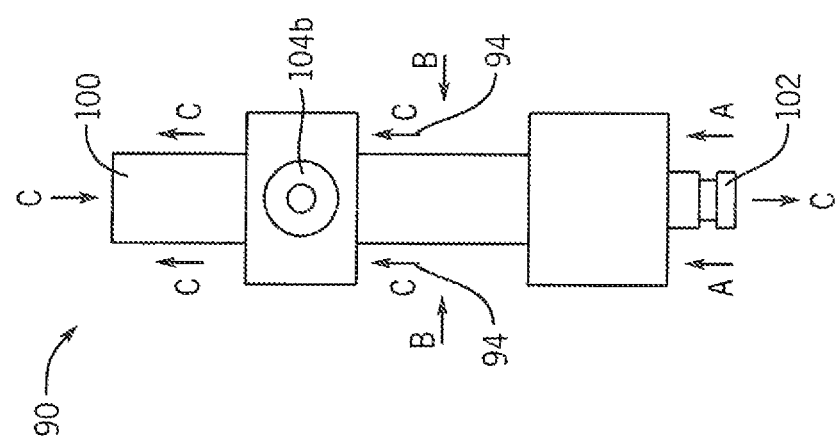
FIG. 4A illustrates a pictorial view of a mixing body.

Still referring to FIGS. 3 and 4A, the mixing body includes first and second openings 104a and 104b, respectively, for accommodating the light source 52 and the light sensitive receiver 54 with fluid tight seals. In one aspect, the first openings 104a could receive the light source 52, and the second opening 104b could receive the light sensitive receiver 54, and the first and second openings 104a and 104b could be opposing such that a fluid inspection region 106 for transmitting light through the mixed fluid is formed in between. Transmission of light from the light source 52 to the light sensitive receiver 54, through the fluid inspection region 106, may allow determining a concentration of the chemical fluid in the mixed fluid by determining how much light is received by the light sensitive receiver 54 (and how much light is inhibited by the mixed fluid).

Figure 5:
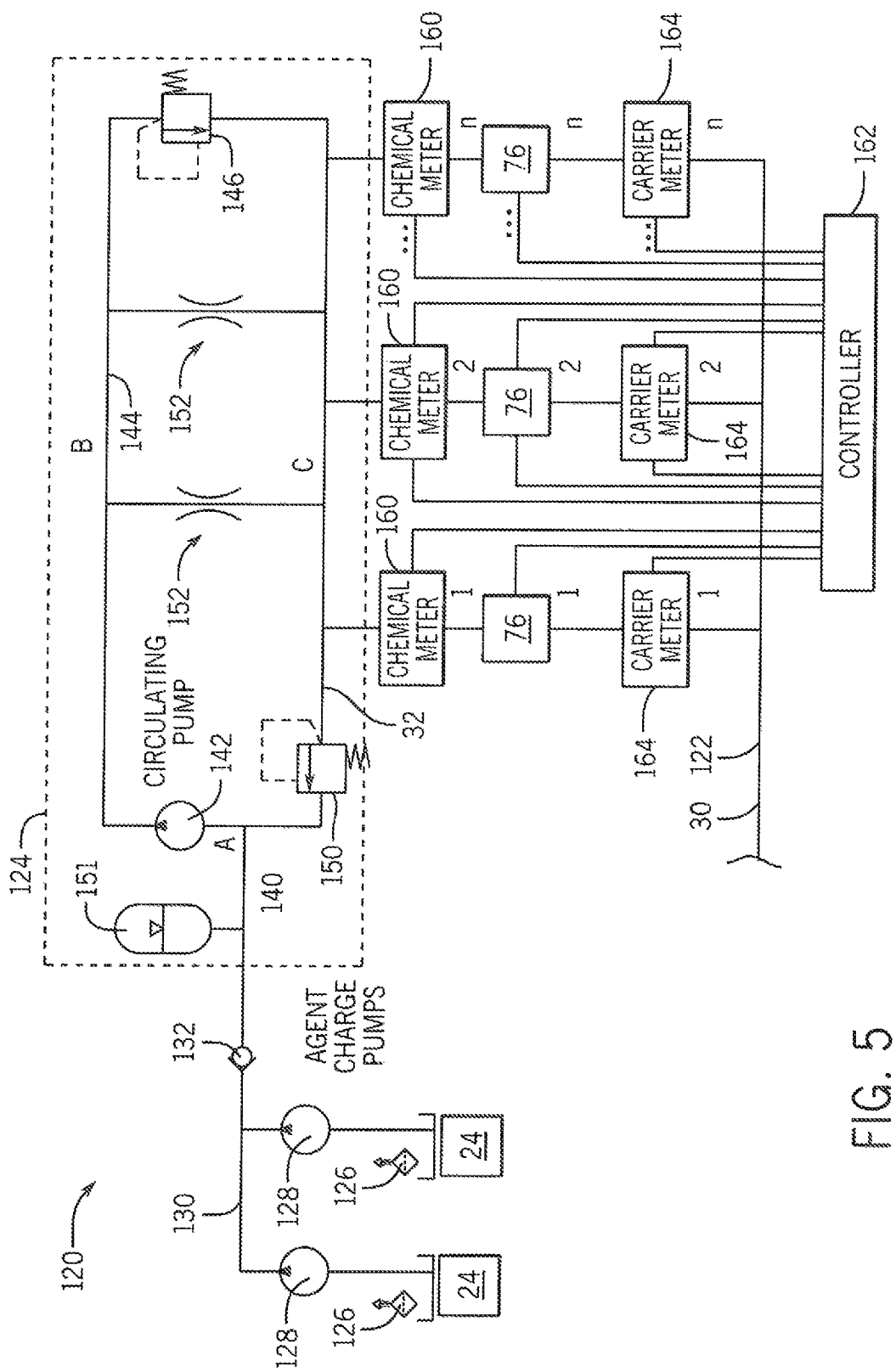
FIG. 5 illustrates a schematic view of a spray system for distributing a chemical fluid directly at each spray nozzle assembly in accordance with the present invention.

Referring now to FIG. 5, a schematic view of a spray system 120 for distributing a chemical fluid directly at each spray nozzle assembly is provided in accordance with the present invention. A first distribution rail 122 is provided for distributing the carrier fluid. The first distribution rail 122 may consist of the primary distribution lines 30 and may lead to the primary fluid tank 16. The first distribution rail 122 may further consist of one or more charge pumps, accumulators, control valves, pressure relief valves, manifolds and/or supplemental distribution lines in the path as understood in the art for effecting various sprayer configurations.

A second distribution rail 124 is provided for distributing the chemical fluid. The second distribution rail 124 may consist of the secondary distribution lines 32 and may lead to either of the secondary fluid tanks 24. The second distribution rail 124 may further consist of one or more charge pumps, accumulators, control valves, pressure relief valves, manifolds and/or supplemental distribution lines in the path as understood in the art for effecting various sprayer configurations.

In a preferred aspect, chemical fluid may be drawn from one or both of the secondary fluid tanks 24, through filtered vents 126 on the secondary fluid tanks 24, via chemical charge pumps 128 (filters between the secondary fluid tanks 24 and chemical charge pumps 128 may also be provided). The chemical fluid may be drawn upon a charge pump line 130, and may be controlled by a charge pump check valve 132. The charge pump check valve 132 may be a passive check valve in which the chemical fluid in the charge pump line 130 may be mechanically stopped from flowing if there is insufficient pressure applied by the mixed fluid against, the charge pump check valve 132, or the chemical fluid may be allowed to flow if there is a build-up of sufficient pressure of the chemical fluid against the charge pump check valve 132. In an alternative aspect, the charge pump check valve 132 could be an actively controlled solenoid valve as described above with respect to FIG. 3.

Upon the chemical fluid flowing through the charge pump check valve 132, the chemical fluid may then enter the second distribution rail 124 under pressure. In a first section 140 of the second distribution rail 124 (identified as section "A"), the chemical fluid may be drawn by a circulation distribution pump 142 providing an even greater increase in pressure. The circulation distribution pump 142 may, in turn, lead to a second section 144 of the second distribution rail 124 (identified as section "B"). In the second section 144, the chemical fluid may be sent varying distances along the wing boom 22, perhaps on the order of 100 feet or more.

A first pressure relief valve 146 couples the second section 144 to a third section 148 (identified as section "C"). The first pressure relief valve, 146 maintains a pressure differential between the second section 144 (section B) and the third section 148 (section C). A second pressure relief valve 150, in turn, couples the third section 148 (section C) back to the first section 140 (section A). The second pressure relief valve 150 similarly maintains a pressure differential between the third section 148 (section C) and the first section 140 (section A). An accumulator 151 may be coupled to the first section 140 (section A) in case the chemical fluid pressure is too great. The accumulator 151 may also allow the chemical charge pumps 128 to be operated cyclically to charge a given volume of chemical fluid into the first section 140 (section A), which is fed to the circulating pump over time by the accumulator 151.

The second distribution rail 124 distributes the chemical fluid at a higher pressure than the first distribution rail 122 distributing the carrier fluid. The pressure of the chemical fluid downstream of the circulation distribution pump 142 (section B) is greater than the pressure of the chemical fluid downstream of the first pressure relief valve 146 (section C). Also, the pressure of the chemical fluid downstream of the first pressure relief valve 146 is greater than the pressure of the chemical fluid downstream of the second pressure relief valve 150 (section A).

An optional plurality of pressure flow compensators 152 may be provided between the second section 144 (section B) and the third section 148 (section C), The pressure flow compensators 152 may enhance mixing of the chemical fluid in the second distribution rail 124 over long distances so that relatively uniform concentrations may be maintained at all nozzles despite a lengthy wing boom or excess number of nozzles.

A first plurality of valves 160 (ranging from 1 to n) is provided in the spray system 120 for metering the chemical fluid to individual nozzles (ranging from 1 to n). The first plurality of valves 160, which may be solenoid valves similar to those described above with respect to FIG. 3, may be in communication with the second distribution rail 124. In particular, the first plurality of valves 160 may each receive the chemical fluid at various points along the third section 148 (section C) extending along the wing boom 22.

Each of the first plurality of valves 160 may be electronically controlled by a controller 162 to meter the chemical fluid to a respective spray nozzle assembly 76 (such as to the mixing body inlet 50 of each spray nozzle assembly 76). The controller 162 may be a microprocessor, a microcontroller or other programmable logic element as known the art.

A second plurality of valves 164 (ranging from 1 to n) may be provided in the spray system 120 for metering the carrier fluid to individual nozzles (ranging from 1 to n). The second plurality of valves 164, which may also be solenoid valves, may be in communication with the first distribution rail 122. In particular, the second plurality of valves 164 may each receive the carrier fluid at various points extending along the wing boom 22. Each of the second plurality of valves 164 may be electronically controlled by a controller 162 to meter the carrier fluid to a respective spray nozzle assembly 76 (such as to the first or second nozzle body inlets 78a or 78b, respectively, of each spray nozzle assembly 76). Given the lower pressure requirements for the first distribution rail 122, in an alternative aspect, fewer second valves 164, or a single second valve 164, could be used to meter the carrier fluid to all of the spray nozzle assemblies 76.

Figure 6:
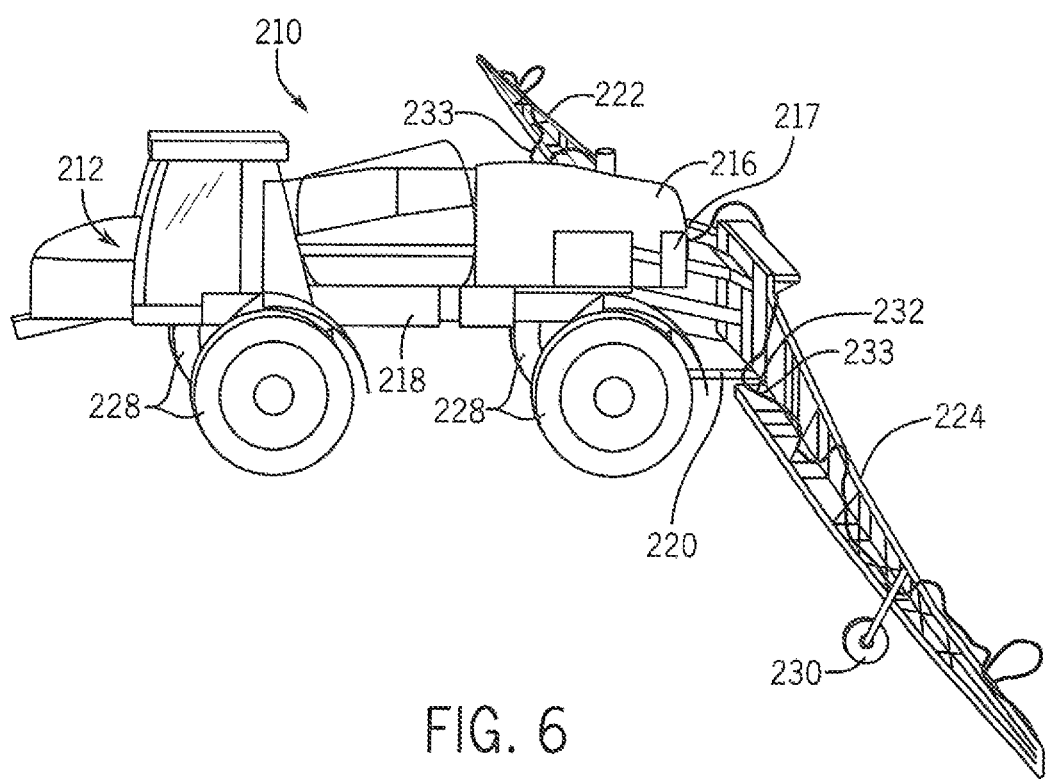
FIG. 6 illustrates a pictorial view of an alternative spraying system in accordance with the present invention.

Referring now to FIG. 6, a pictorial view of an alternative spraying system is provided in accordance with the present invention. A field spraying system 210 may be comprised of a self-propelled sprayer 212 having primary and secondary fluid tanks 216 and 217, respectively, that are supported by a chassis 218 in a known manner. As also known in the art, a rear end 220 of the chassis 218 may supports a pair of wing booms 222, 224 to which a series of the spray nozzle assemblies (not shown) may be coupled. The chassis 218 may be supported by a set of tires 228, and the wing booms may be supported by smaller wheels 230. Primary and secondary distribution lines 232 and 233, respectively, may be flow coupled to the primary and secondary fluid tanks 216 and 217, respectively, in order to provide field spraying capability similar to the field spraying system 10 described above with respect to FIG. 1.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray system for use with an agricultural sprayer comprising:
   a first distribution rail for distributing a first fluid;
   a second distribution rail for distributing a second fluid;
   a first plurality of metering valves in communication with the second distribution rail; and
   a plurality of spray nozzle assemblies, each spray nozzle assembly including:
   a nozzle body having first and second opposite ends, the nozzle body defining at least one nozzle body inlet disposed between the first and second ends of the nozzle body for receiving the first fluid and an outlet at the second end of the nozzle body;
   a mixing body including a first end and a second end, the first end of the mixing body being coupled directly to the first end of the nozzle body, the mixing body defining a mixing body inlet for receiving the second fluid, the mixing body further defining a mixing chamber in communication with the mixing body inlet and the at least one nozzle body inlet of the nozzle body and being configured for mixing the first and second fluids to provide a mixed fluid; and a control valve coupled directly to the second end of the mixing body such that the mixing body extends directly between the control valve and the nozzle body, the control valve being disposed along a flow path of the mixed fluid through the spray nozzle assembly such that the control valve is positioned downstream of the mixing chamber of the mixing body and upstream of the outlet of the nozzle body;

a second plurality of metering valves in communication with the first distribution rail, wherein the first inlet of each spray nozzle assembly is in communication with a corresponding metering valve of the second plurality of metering valves for receiving the first fluid;

wherein:

the outlet of the nozzle body is configured to spray the mixed fluid from the mixing chamber;

the control valve is operable to adjust a flow of the mixed fluid supplied from the mixing chamber of the mixing body to the outlet of the nozzle body;

the at least one nozzle body inlet of each spray nozzle assembly is in communication with the first distribution rail for receiving the first fluid, the mixing body inlet of each spray nozzle assembly is in communication with a corresponding valve of the plurality of metering valves for receiving the second fluid; and the second distribution rail distributes the second fluid at a higher pressure than the first distribution rail distributes the first fluid;

wherein the second distribution rail further includes a second pressure relief valve, wherein the pressure of the second fluid downstream of the first pressure relief valve is greater than the pressure of the second fluid downstream of the second pressure relief valve;

wherein the second distribution rail includes a circulation pump and a first pressure relief valve, the pressure of the second fluid downstream of the circulation pump being greater than the pressure of the second fluid downstream of the first pressure relief valve.

2. The spray system of claim 1, wherein the plurality of metering valves comprises a plurality of solenoid valves, each solenoid valve of the plurality of solenoid valves configured to meter the second fluid supplied to the mixing body inlet of a corresponding spray nozzle assembly of the plurality of spray nozzle assemblies.

3. The spray system of claim 1, wherein the first fluid is a carrier fluid and the second fluid is a chemical fluid.

4. The spray system of claim 1, wherein the second distribution rail further includes an accumulator between the circulation pump and at least one of the first and second pressure relief valves.

5. The spray system of claim 1, wherein the plurality of metering valves are in communication with the second distribution rail between the first and second pressure relief valves.

6. The spray system of claim 1, further comprising a primary storage tank in communication with the first distribution rail for holding the first fluid and a secondary storage tank in communication with the second distribution rail for holding the second fluid.

7. The spray system of claim 6, further comprising a charge pump in communication with the secondary storage tank.

8. The spray system of claim 1, wherein the at least one nozzle body inlet comprises first and second nozzle body inlets defined by the nozzle body for receiving the first fluid.

9. The spray system of claim 1, wherein:

the flow path comprises first and second flow paths defined within the mixing body;

the mixed fluid is directed through the first flow path in a first direction from the mixing chamber towards the control valve;

the mixed fluid is directed through the second flow path in a second direction from the control valve towards the outlet of the nozzle body, the second direction being opposite the first direction; and the control valve is operable to adjust the flow of the mixed fluid supplied though the second flow path to the outlet of the nozzle body.

10. The spray system of claim 9, wherein the first flow path is coaxial with the second flow path.

11. A spray system for use with an agricultural sprayer comprising:

a first distribution rail for distributing a first fluid;

a second distribution rail for distributing a second fluid;

a first plurality of metering valves in communication with the second distribution rail; and a plurality of spray nozzle assemblies, each spray nozzle assembly including:

a nozzle body having first and second opposite ends, the nozzle body defining at least one nozzle body inlet disposed between the first and second ends of the nozzle body for receiving the first fluid and an outlet at the second end of the nozzle body;

a mixing body connected to the first end of the nozzle body, the mixing body defining a mixing body inlet for receiving the second fluid, the mixing body further defining a mixing chamber in communication with the mixing body inlet and the at least one nozzle body inlet of the nozzle body and being configured for mixing the first and second fluids to provide a mixed fluid; and a control valve coupled to the mixing body;

a second plurality of metering valves in communication with the first distribution rail, wherein the first inlet of each spray nozzle assembly is in communication with a corresponding metering valve of the second plurality of metering valves for receiving the first fluid;

wherein:

a first flow path is defined within the mixing body through which the mixed fluid is directed in a first direction from the mixing chamber towards the control valve;

a second flow path is defined within the mixing body through which the mixed fluid is directed in a second direction from the control valve towards the outlet of the nozzle body, the second direction being opposite the first direction; and the control valve is operable to adjust a flow of the mixed fluid supplied though the second flow path to the outlet of the nozzle body;

wherein the second distribution rail further includes a second pressure relief valve, wherein the pressure of the second fluid downstream of the first pressure relief valve is greater than the pressure of the second fluid downstream of the second pressure relief valve;

wherein the second distribution rail includes a circulation pump and a first pressure relief valve, the pressure of the second fluid downstream of the circulation pump being greater than the pressure of the second fluid downstream of the first pressure relief valve.

12. The system of claim 11, wherein the first flow pat' is coaxial with the second flow path.

13. The system of claim 12, wherein the first flow path is defined within the mixing body radially outwardly relative to the second flow path.

14. The system of claim 11, wherein:
the at least one nozzle body inlet of each spray nozzle assembly is in communication with the first distribution rail for receiving the first fluid, the mixing body inlet of each spray nozzle assembly is in communication with a corresponding valve of the plurality of metering valves for receiving the second fluid; and
the second distribution rail distributes the second fluid at a higher pressure than the first distribution rail distributes the first fluid.

15. The spray system of claim 11, wherein the control valve is coupled to the mixing body such that the mixing body extends between the control valve and the outlet of the nozzle body.

16. The spray system of claim 15, wherein the mixing body includes a first end and a second end, the first end of the mixing body being coupled directly to the first end of the nozzle body and the second end of the mixing body being coupled directly to the control valve such that the mixing body extends directly between the control valve and the nozzle body.

* * * * *